H. W. Holly.
Implement for Dyers & Bleachers.
Nº 73331. Patented Jan. 14, 1868.
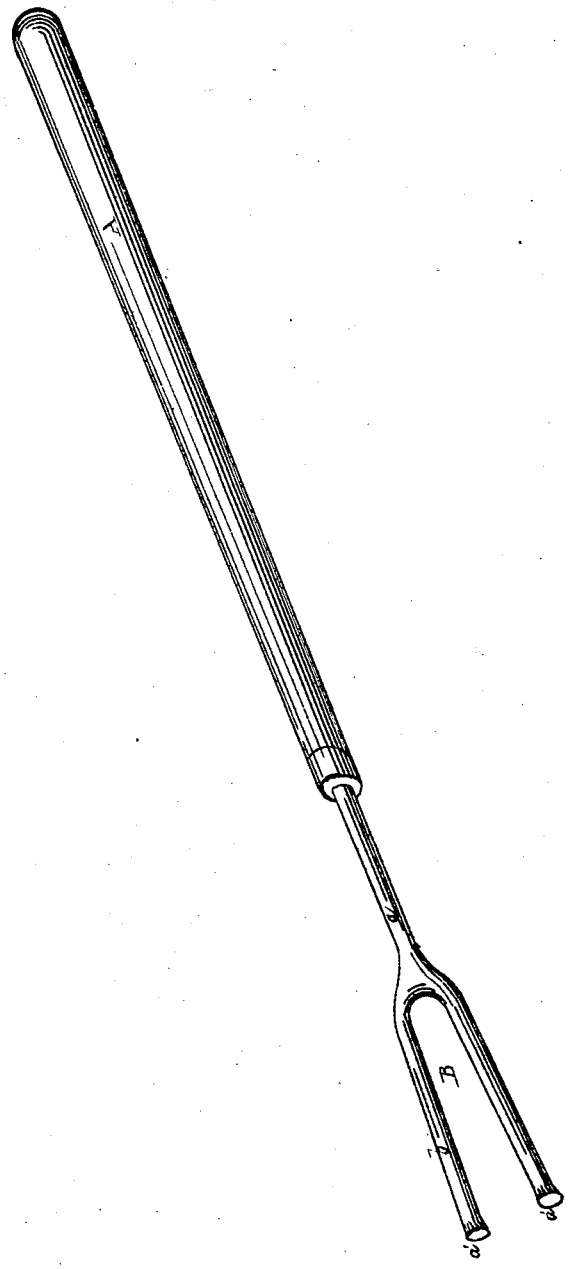
Witnesses:
J M Coomby
Geo Reed
Inventor:
H. W. Holly.

United States Patent Office.

H. W. HOLLY, OF NORWICH, CONNECTICUT.

Letters Patent No. 73,831, dated January 14, 1868.

---

IMPROVED IMPLEMENT FOR DYERS AND BLEACHERS.

---

The Schedule referred to in these Letters Patent and making part of the same.

---

TO ALL WHOM IT MAY CONCERN:

Be it known that I, H. W. HOLLY, of Norwich, in the county of New London, and State of Connecticut, have invented a new and improved Implement for the Use of Dyers, Bleachers, and others; and I do hereby declare that the following is a full, clear, and exact description of the same, reference being had to the accompanying drawing, making a portion of this specification, which is a perspective view of a fork constructed according to my invention.

This invention is designed to enable dyers and others to conveniently remove cloths or fabrics from hot or boiling water or liquors, without danger of scalding the hands in so doing; and to this end the invention consists in a fork, the tines of which are knobbed or enlarged at their extremities in such a way that the cloths or fabrics being wound around them will be securely retained thereon without injury while being lifted or removed, as circumstances may require.

To enable others to understand the nature and construction of my invention, I will proceed to describe it with reference to the drawing.

A represents a cylindrical or other properly-shaped staff or handle, of any suitable length, into one end of which is fitted the shank $a$ of a fork, B, the tines of which are shown at $b$. The outer extremities of these tines are enlarged or knobbed, as shown at $a'$.

In using the implement, the pronged or forked end thereof is thrust among the cloths or fabrics contained in the boiler, vat, or other vessel, and the said implement is turned around its longitudinal axis in such manner as to wind the cloths or fabrics upon the tines, whereupon they may be lifted or withdrawn from the boiler or vessel, and moved or carried upon the fork to any distance required, the cloths or fabrics being effectually prevented from slipping from the tines of the said fork by the knobbed or enlarged ends thereof. When it is desired to disengage the cloth or fabric from the implement, the latter is partially turned in such a way as to slightly unwind such fabric, which is then easily shaken from the tines. Inasmuch as the winding of the fabric upon the tines, as hereinbefore fully set forth, in a measure compresses the same, it follows that the largest proportion of the dye or other liquid is expelled therefrom, thereby preventing any undue waste of such liquid, which would otherwise be lost in moving the fabric from the boiler or other vessel.

The implement may, furthermore, not only be employed in dye-works and similar establishments, but is also designed for use in the ordinary operation of washing clothes, &c.

What I claim as my invention, and desire to secure by Letters Patent, is—

The forked implement, having the extremities of its tines knobbed or enlarged, substantially as herein set forth or the purpose specified.

H. W. HOLLY.

Witnesses:
J. W. COOMBS,
G. W. REED.